(12) United States Patent
Rane et al.

(10) Patent No.: US 11,436,448 B2
(45) Date of Patent: Sep. 6, 2022

(54) SYSTEM AND METHOD FOR DIFFERENTIALLY PRIVATE POOL-BASED ACTIVE LEARNING

(71) Applicant: Palo Alto Research Center Incorporated, Palo Alto, CA (US)

(72) Inventors: Shantanu Rane, Menlo Park, CA (US); Alejandro E. Brito, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 466 days.

(21) Appl. No.: 16/706,556

(22) Filed: Dec. 6, 2019

(65) Prior Publication Data
US 2021/0174153 A1    Jun. 10, 2021

(51) Int. Cl.
*G06F 9/44*    (2018.01)
*G06K 9/62*    (2022.01)
*G06F 17/18*   (2006.01)
*G06N 20/10*   (2019.01)

(52) U.S. Cl.
CPC .......... *G06K 9/6269* (2013.01); *G06F 17/18* (2013.01); *G06K 9/6259* (2013.01); *G06N 20/10* (2019.01)

(58) Field of Classification Search
CPC .................................................. G06K 9/6269
USPC .......................................................... 706/12
See application file for complete search history.

(56) References Cited

U.S. PATENT DOCUMENTS

| | | | |
|---|---|---|---|
| 9,607,272 B1* | 3/2017 | Yu .......................... | G06N 20/00 |
| 2017/0116544 A1* | 4/2017 | Johnson .................. | G06F 16/35 |
| 2018/0040336 A1* | 2/2018 | Wu ......................... | G10L 19/26 |
| 2019/0227980 A1* | 7/2019 | McMahan ............ | G06K 9/6256 |

\* cited by examiner

Primary Examiner — Timothy A Mudrick
(74) Attorney, Agent, or Firm — Shun Yao; Yao Legal Services, Inc.

(57) ABSTRACT

The system determines a version space associated with a set of data comprising a pool of unlabeled samples and a first plurality of labeled samples, wherein the version space includes a first set of classifiers corresponding to the first plurality of labeled samples. The system selects, from the pool of unlabeled samples, a second plurality of unlabeled samples comprising informative samples and non-informative samples. A respective informative sample corresponds to a first hyperplane which intersects the version space, and a respective non-informative sample corresponds to a second hyperplane which does not intersect the version space. The system acquires labels corresponding to the second plurality of unlabeled samples to obtain a third plurality of labeled samples. The system updates the first set of classifiers based on the third plurality of labeled samples, thereby improving accuracy of the first set of classifiers.

20 Claims, 9 Drawing Sheets

SYSTEM AND METHOD FOR DIFFERENTIALLY PRIVATE POOL-BASED ACTIVE LEARNING

FIELD

This disclosure is generally related to machine learning and data classification. More specifically, this disclosure is related to a system and method for differentially private pool-based active learning.

RELATED ART

In the field of machine learning, an essential operation involves training a classifier using labeled data. Traditional non-interactive supervised learning is often label-hungry, i.e., a very large number of labeled samples are necessary to train an accurate classifier. In contrast, active learning approaches seek to train a classifier using fewer informative samples, rather than employing the very large number of labeled samples. This can be particularly useful when very little labeled data is available, or when labeling is expensive.

One specific field of active learning involves creating and analyzing privacy-aware variants, which can be relevant in many practical applications. One such practical application is federated learning, in which an accurate model is to be trained using data that is distributed over a large number of clients. One way to achieve this is for a centralized node to send an initial crude model to the clients, ask the clients to independently update the model based on their local data, and then aggregate the individual client models. In this approach, although the clients do not send any data to the aggregator, privacy cannot be guaranteed. An adversarial aggregator can observe the client models and make inferences about a client's local and potentially sensitive data using model inversion and membership inference attacks.

Some differentially private mechanisms have been proposed to provide strong statistical guarantees against the success of such attacks. However, these differentially private mechanisms have been proposed for training machine learning models in the traditional non-interactive supervised learning setting (where an abundance of labeled data is available). There has been significantly less investigation on differentially private mechanisms for active learning.

SUMMARY

One embodiment provides a system for facilitating data classification. During operation, the system determines a version space associated with a set of data comprising a pool of unlabeled samples and a first plurality of labeled samples, wherein the version space includes a first set of classifiers corresponding to the first plurality of labeled samples. The system selects, from the pool of unlabeled samples, a second plurality of unlabeled samples comprising informative samples and non-informative samples, wherein a respective informative sample corresponds to a first hyperplane which intersects the version space, and wherein a respective non-informative sample corresponds to a second hyperplane which does not intersect the version space. The system acquires labels corresponding to the second plurality of unlabeled samples to obtain a third plurality of labeled samples. The system updates the first set of classifiers based on the third plurality of labeled samples to obtain a second set of classifiers in the version space, thereby improving accuracy of the first set of classifiers.

In some embodiments, selecting the second plurality of unlabeled samples is determined using randomized trials with respect to a Bernoulli distribution.

In some embodiments, selecting the second plurality of unlabeled samples comprises selecting the informative samples from the second plurality of unlabeled samples by determining whether an informative sample should be selected in a randomized trial according to a first random probability distribution (e.g., a Bernoulli distribution). In response to determining that a first informative sample should be selected in a randomized trial with respect to the first random probability distribution, the system acquires a label corresponding to the first informative sample; and in response to determining that a second informative sample should not be selected in a randomized trial with respect to the first random probability distribution, the system returns the second informative sample to the pool of unlabeled samples.

In some embodiments, selecting the second plurality of unlabeled samples comprises selecting the non-informative samples from the second plurality of unlabeled samples by determining whether a non-informative sample should be selected in a randomized trial with respect to a second random probability distribution. In response to determining that a first non-informative sample should be selected in a randomized trial with respect to the second random probability distribution, the system acquires a label corresponding to the first non-informative sample; and in response to determining that a second non-informative sample should not be selected in the randomized trial with respect to the second random probability distribution, the system removes the second non-informative sample from the pool of unlabeled samples.

In some embodiments, the version space represents a volume comprising: the first set of classifiers indicated as points in an input space associated with the set of data; the pool of unlabeled samples indicated as a first set of hyperplanes in the input space; and labeled samples, including one or more of the first and the third plurality of labeled samples, indicated as a second set of hyperplanes in the input space.

In some embodiments, the system updates the first set of classifiers based on the third plurality of labeled samples and further based on the first plurality of labeled samples.

In some embodiments, the first plurality of labeled samples and the third plurality of labeled samples comprise currently labeled samples. The system trains a classifier for the set of training data based on all the currently labeled samples.

In some embodiments, the first plurality of labeled samples and the third plurality of labeled samples comprise currently labeled samples. The system trains a classifier for the set of training data based on a subset of the currently labeled samples, wherein the subset contains a plurality of recently labeled samples and excludes a plurality of older labeled samples.

In some embodiments, updating the first set of classifiers is based on one or more of: an output perturbation; an objective perturbation; and an exponential mechanism.

In some embodiments, a respective classifier is a Support Vector Machine (SVM) classifier. The system orders the unlabeled samples based on a closeness to an optimal classifier for the labeled samples to obtain an ordered list of unlabeled samples; and for each unlabeled sample in a first portion of the ordered list, in descending order, the system performs the following operations. In response to determining that a first unlabeled sample should be selected in a randomized trial with respect to a first random probability distribution, the system acquires a label corresponding to the first unlabeled sample; and in response to determining that a second unlabeled sample should not be selected in a randomized trial with respect to the first random probability distribution, the system returns the second unlabeled sample to the pool of unlabeled samples.

In some embodiments, determining the first portion of the ordered list is based on determining whether a respective sample falls in an informative band associated with the optimal classifier.

BRIEF DESCRIPTION OF THE FIGURES

In the figures, like reference numerals refer to the same figure elements.

DETAILED DESCRIPTION

Figure 1:
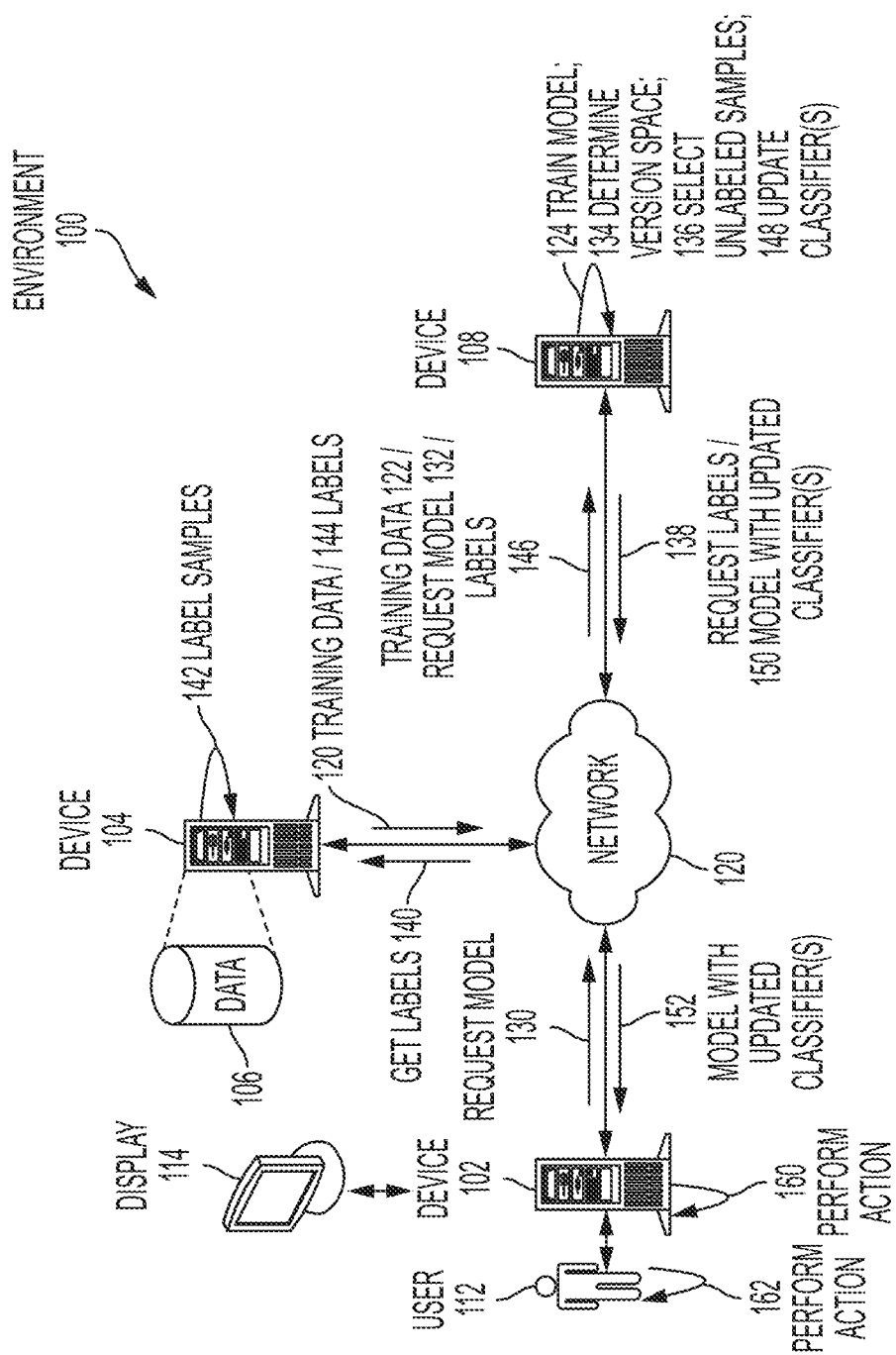
FIG. 1 presents an exemplary environment 100 which facilitates data classification, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

I. Introduction and Overview

The embodiments described herein provide a system for efficiently training a machine learning model using the active learning modality while preserving the privacy of data points chosen for training. The system is based on the fact that active learning involves both selection of samples for labeling ("selection step" or "sample selection step") and update of a classifier as new labeled samples become available ("update step" or "classifier update step"). The system can preserve differential privacy during the selection step by randomizing the sample selection procedure. The system can also preserve differential privacy during the update step by randomizing the classifier model that is released to the public.

As described herein, traditional non-interactive supervised learning is often label-hungry, i.e., a very large number of labeled samples are necessary to train an accurate classifier. In contrast, active learning approaches seek to train a classifier using fewer informative samples, rather than employing the very large number of labeled samples. This can be particularly useful when very little labeled data is available, or when labeling is expensive.

Creating and analyzing privacy-aware variants in active learning can be relevant in many practical applications, such as federated learning, in which an accurate model is to be trained using data that is distributed over a large number of clients. One way to achieve this is for a centralized node to send an initial crude model to the clients, ask the clients to independently update the model based on their local data, and then aggregate the individual client models. In this approach, although the clients do not send any data to the aggregator, privacy cannot be guaranteed. An adversarial aggregator can observe the client models and make inferences about a client's local and potentially sensitive data using model inversion and membership inference attacks.

Some differentially private mechanisms have been proposed to provide strong statistical guarantees against the success of such attacks. However, these differentially private mechanisms have been proposed for training machine learning models in the traditional non-interactive supervised learning setting (where an abundance of labeled data is available). There has been significantly less investigation on differentially private mechanisms for active learning.

The embodiments described herein provide a system which facilitates data classification, specifically, which facilitates achieving differential privacy in a pool-based active learning setting. The system can select unlabeled samples for querying in a privacy-aware manner. Subsequently, the system can perform a classifier update in a privacy-aware manner. The privacy-aware selection step may be performed based on, e.g., a Bernoulli selection, a version space concept, and an informative band around the classifier. The privacy-aware update step of the model may be based on, e.g., an output perturbation, an objective perturbation, and an exponential mechanism. Furthermore, the model may be updated using a previous classifier and new labeled data. The model may also be updated without a previous classifier but using all data labeled so far (e.g., all currently labeled data), or on a subset of all currently labeled data.

The system analyzes pool-based active learning under a differential privacy guarantee. At every active learning iteration, the system selects some samples to be labeled by an oracle, which returns new labels. The system then uses these new labels to update the classifier. In preserving differential privacy during both the sample selection step and the classifier update step, the system uses the concept of a version space of possible hypotheses (i.e., classifiers). This concept helps establish a principled notion of the informativeness of a pool sample: When informative samples are labeled and used for training, the version space shrinks, and yields more and more accurate classifiers. The version space concept and an analysis of using the version space in an active learning workflow without privacy considerations is described below in Section III.

To provide differential privacy, the system queries the oracle with both informative and non-informative samples using a simple randomized sampling scheme. The system describes the differential privacy guarantee, and also characterizes the increase in label complexity due to the privacy mechanism, as described below in Section IV. Applying this theoretical analysis in practice using an implementation of a Support Vector Machine (SVM)-based active learner is described below in Section V.

Users of the system can include an individual with a smartphone, a mobile device, or a computing terminal. Users of the system can also include any client in a federated learning setting, which is a machine learning setting where a goal is to train a high-quality centralized model with training data distributed over a large number of clients each with potentially unreliable and relatively slow network connections. Thus, the embodiments described herein can result in more efficiently training the machine learning model, which can also result in an improved model and a more efficient overall user experience. Furthermore, by efficiently training a machine learning model using the active learning modality while preserving the privacy of the data points chosen for training, the embodiments described herein provide an improvement in the functioning of a computer in terms of both efficiency and performance. The embodiments described herein also result in an improvement to several technologies and technical fields, including but not limited to: artificial intelligence; machine learning and analytics; database protection; data mining (including of a significant volume of data); data classification; data regressions; and anomaly detection.

Exemplary Computer System

FIG. 1 presents an exemplary environment 100 which facilitates data classification, in accordance with an embodiment of the present application. Environment 100 can include: a device 102, an associated user 112, and an associated display screen 114; a device 104 and an associated or included storage device 106; and a device 108. Devices 102, 104, and 108 can communicate with each other via a network 120. Device 102 can be a client computing device, e.g., a laptop computer, a mobile telephone, a smartphone, a tablet, a desktop computer, and a handheld device. Devices 102, 104, and 108 can be, e.g., a computing device, a server, a networked entity, and a communication device.

During operation, device 108 can request from device 104 training data (not shown), and device 104 can send training data 120 to device 108. Training data can include a plurality of labeled data or labeled samples. Device 108 can receive training data 120 (as training data 122), and perform a train model 124 function based on training data 122. The model can include one or more classifiers based on training data 122 (e.g., the labeled samples). Device 108 can also have access to a set of data which includes a pool of unlabeled samples and a plurality of already labeled samples (i.e., training data previously received by device 108 and used by device 108 to train the model, also referred to as "previously labeled samples").

Subsequently, user 112 via device 102 can send a request model 130 to device 108. Device 108 can receive request model 130 (as a request model 132), and can perform a determine version space 134 function. The version space is constructed using the labeled samples received to date by device 108, such as both training data 122 and previously labeled samples. The version space can also represent a volume which includes: a first set of classifiers indicated as points in an input space associated with an overall set of data; a pool of unlabeled samples indicated as a first set of hyperplanes in the input space; and the labeled samples received to date, including training data 122, previously labeled samples, and any subset of all currently labeled samples, where the labeled samples are indicated as a second set of hyperplanes in the input space. An exemplary version space is described below in relation to FIG. 2B.

Device 108 can select, from the pool of unlabeled samples, a plurality of unlabeled samples (via a select unlabeled samples 136 function), which can include both informative and non-informative samples. An informative sample can correspond to a hyperplane which intersects the version space, while a non-informative sample can correspond to a hyperplane which does not intersect the version space, as described below in relation to FIG. 2B. Device 108 can send a request labels 138 to device 104. Device 104 can be an oracle or expert, i.e., can provide a label for a given sample. Device 104 can receive the request (as a get labels 140), and can perform a label samples 142 function. Device 104 can return labels 144 to device 108. Device 108 can receive labels 144 (as labels 146), where labels 146 correspond to the selected unlabeled samples for which device 108 requested the labels (e.g., via select unlabeled samples 136 and request labels 138).

Based on the received labels 146, device 108 can update the model by performing an update classifier(s) 148 function. As a result, device 108 can obtain a second set of classifiers which improve the accuracy of the first set of classifiers. Device 108 can return a model with updated classifier(s) 150 to device 102. Device 102 can receive model 150 (as a model with updated classifier(s) 152).

Upon receiving model 152, device 102 can perform an action (function 160). For example, device 102 can display, on its display screen 114, a visual indication of model 152. The visual indication can also include the determined version space 134 which indicates the unlabeled samples as a first type of hyperplane and the labeled samples as a second type of hyperplane. The visual indication can also depict the input space as the version space, specifically, as a volume bounded by the hyperplanes representing the labeled samples, and can also indicate the first set of classifiers (and/or the obtained set of classifiers) as points in the input space. An exemplary version space is described below in relation to FIG. 2B.

Furthermore, upon viewing the visual indication of model 152 on display 114, user 112 can perform an action (function 162). The action can include sending another manual request to update the model. In some embodiments, user 112 can review the data, classifiers, and labeled samples, and, e.g., review the classified data in light of other historical data, remediate a physical issue related to the classified data, and perform any physical action relating to the visual indication of model 152 on display 114. For example, user 112 can perform an action which can affect and improve the operation and performance of a physical (e.g., manufacturing) system associated with the data set of the input space. The action can be a remedial or a corrective action to ensure consistent and smooth operation of the overall physical system. User 112 can also monitor, observe, and classify subsequent testing data to determine whether the actions of user 112 have the intended effect.

In some embodiments, device 108 trains the model without receiving any requests from another device (e.g., without receiving request model 130/132 from device 102). Device 108 can subsequently publish, or make available publicly, the trained model at each and every iteration, based on the parameters used as described below in relation to Section IV.D. Device 108 can therefore provide differential privacy in a pool-based setting for active learning, based on the methods described herein.

II. Related Work

Differential privacy has been extensively studied and applied. However, as noted earlier, there has been significantly less investigation on differentially private mechanisms for active learning. In one work, a differentially private anomaly detector is trained using active learning in a streaming (online) modality. See M. Ghassemi, A. Sarwae, and R. Wright, "Differentially private online active learning with applications to anomaly detection," in *Proc. Workshop in Artificial Intelligence and Security*, pages 117-128, 2016 (hereinafter "Ghassemi"). In Ghassemi, informative samples from the data stream are selected for labeling by an oracle, and using the new labels, a classifier is updated until it reaches a desired accuracy. Another work describes a heuristic to identify and select informative samples (see S. Tong and D. Koller, "Support vector machine active learning with applications to text classification," Journal of machine learning research, 2(November):45-66, 2001 (hereinafter "Tong-Koller")).

However, Tong-Koller is not adapted to the differential privacy of active learning in a pool-based setting, and Ghassemi involves selecting informative samples from a data stream or an online setting. That is, if a sample is not selected the first time it occurs, it is never examined again. In contrast, in the embodiments described herein, the system considers a pool-based setting, i.e., a data sample that is not initially chosen for labeling can be returned to the pool for a possible later labeling opportunity.

Furthermore, in the embodiments described herein, the system analyzes the differentially private mechanism using the version space concept. The version space concept has been used extensively in the analysis of active learning, in particular, to prove convergence of the classifier and to derive bounds on the label complexity. Analyzing the evolution of a differentially private active learner from the perspective of its shrinking version space can be useful for at least two reasons. First, it suggests a natural and principled approach to choose samples for labeling while preserving privacy, and tells how this approach can be approximated for use with practical classifier models. Second, it indicates precisely when adding noise to a classifier to make it differentially private, will also make it less accurate. This, in turn, reveals both good and bad ways to perform the classifier update step.

III. Active Learning Setting: No Privacy

This section provides a review of the version space concept and the disagreement coefficient associated with a classifier. In the embodiments described herein, only the two-class problem is considered, as it is widely encountered in concept learning, anomaly detection, and other related problems. For simplicity, the development is restricted to the case in which the two classes are linearly separable, although generalizing to the agnostic case is also possible. Thus, the classifier is a hyperplane that separates the data samples into classes with labels ±1.

Assume that the active learner has: n training samples denoted by the (sample, label) pairs as $\mathcal{T} = \{(x_i, y_i), x_i \in \mathbb{R}^d, i=1, 2, \ldots, n,\}$; and a pool of m unlabeled samples as $\mathcal{M} = \{z_j \in \mathbb{R}^d, j=1, 2, \ldots, m\}$ The $x_i$ and $z_j$ above belong to an input space $\chi$. An initial classifier $w_0$ has been trained on $\mathcal{T}$. The system can query an oracle (e.g., device 104 in FIG. 1) for labels of a few samples from $\mathcal{M}$, and train the learner to be consistent with all available labels. The rationale is that such a learner will accurately classify data whose distribution matches that of the pool.

A. Version Space

For labeled data $x_i$, $i=1, 2, \ldots, n$ separated by a hyperplane w, a hypothesis $h(\cdot)$ is defined as $h(x_i) = w^T x_i / \|w\|$ where $\|\cdot\|$ is the $\ell_2$ norm and $(\cdot)^T$ is the transpose operator. As a result, in the separable case, a label is assigned as $y_i = 1$ if $h(x_i) > 1$ and $y_i = -1$ otherwise. Thus, $y_i h(x_i) > 0$.

Definition 1: The version space $V$ is the set of all possible hypotheses that separate the labeled data in the feature space $\chi$. The version space is defined in terms of the hypotheses h as well as the hyperplanes w as:

$$V = \{h \in \mathcal{H} \mid \forall i \in \{1, \ldots, n\}, y_i h(x_i) > 0\}. =$$
$$\{w \in \mathcal{W} \mid \|w\| = 1, y_i(w^T x_i) > 0, i = 1, \ldots, n\}$$

The version space concept can be used to describe the evolution of the active learner, both in the non-private case and the differentially private case. Consider a dual representation in which the points in the input space $\chi$ are hyperplanes in the hypothesis space $\mathcal{W}$, while candidate separators w are just points in $\mathcal{W}$. In this representation, it can be shown that the optimal classifier w* is the center of mass of $V$. An approximation of w* is a classifier that maximizes the margin with respect to each class, given by a Support Vector Machine (SVM) classifier.

Figures 2A, 2B:
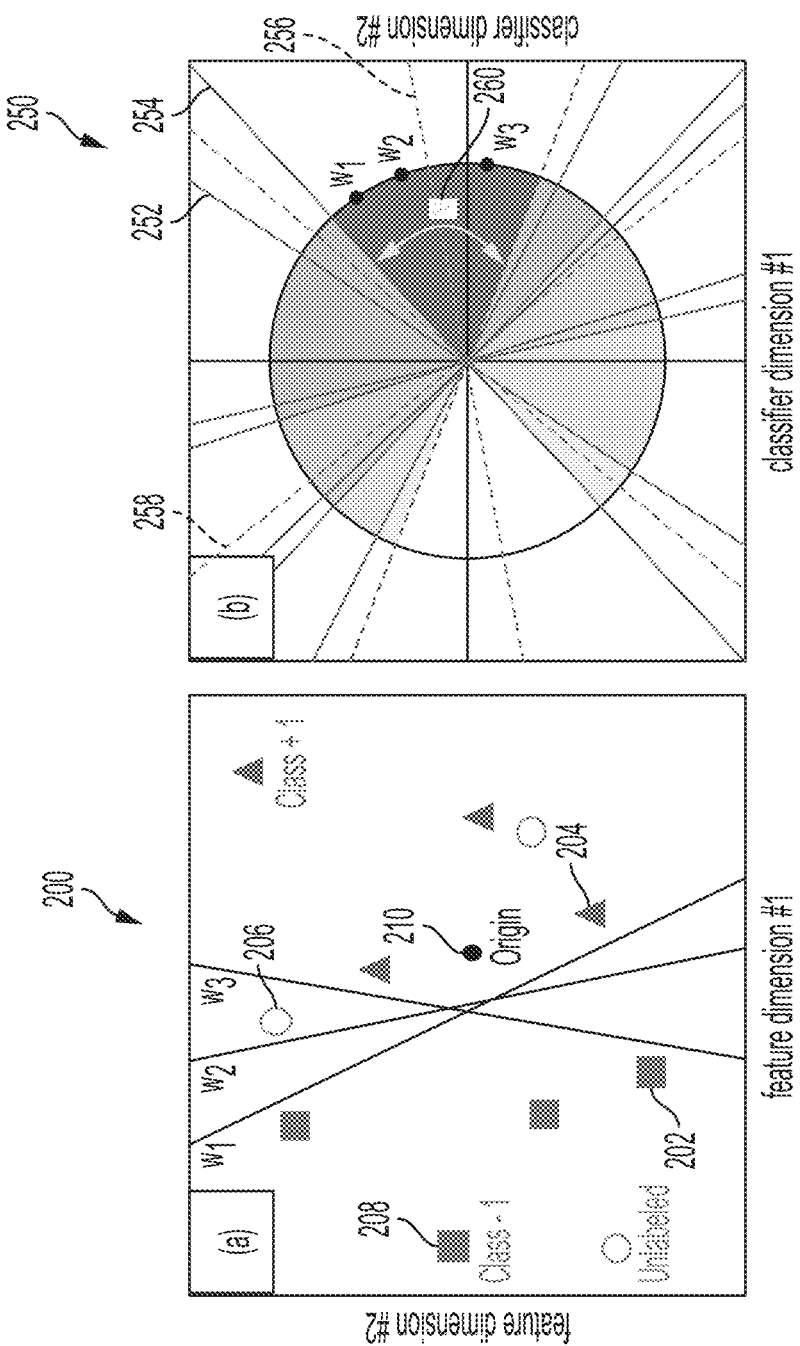
FIG. 2A illustrates a diagram of a typical active learning setting with a few labeled samples and a large pool of unlabeled samples, in accordance with an embodiment of the present application.
FIG. 2B illustrates a diagram of a dual representation in which classifiers appear as points while data samples appear as lines (hyperplanes) in a version space, in accordance with an embodiment of the present application.

FIG. 2A illustrates a diagram 200 of a typical active learning setting with a few labeled samples and a large pool of unlabeled samples, in accordance with an embodiment of the present application. Diagram 200 can represent an input space associated with a set of data. In diagram 200, a plurality of labeled samples of "Class −1" is indicated as filled in blue squares (e.g., labeled samples 202 and 208), while a plurality of labeled samples of "Class +1" is indicated as filled in red triangles (e.g., a labeled sample 204). A plurality (or pool) of unlabeled samples is indicated as open green circles (e.g., an unlabeled sample 206). Three classifiers appear as lines which intersect the input space. The three classifiers are indicated as $w_1$, $w_2$, and $w_3$. An informative sample may be one which improves the accuracy of the classifier(s), while a non-informative sample may be one which does not improve the accuracy of the classifier (s). That is, a sample that is "close" to the classifiers may be informative, while a sample that is "far" may be non-informative. For example, unlabeled sample 206 may be informative because discovering its label may help to improve the accuracy of the classifier(s). In contrast, an unlabeled sample in the far bottom left corner of diagram 200 may be non-informative because discovering its label most likely does not improve the accuracy of the classifier (s).

FIG. 2B illustrates a diagram 250 of a dual representation in which classifiers appear as points while data samples appear as hyperplanes (lines in two-dimension (2D)) in a version space $V$ 260, in accordance with an embodiment of the present application. In diagram 250, the version space $V$ 260 is indicated as the set of points on the unit circle satisfying $y_i h(x_i) = y_i(w^T x_i) > 0$, which is the intersection of half-circles determined by lined representing the training data samples. The solid lines (e.g., a solid blue line 252 and a solid red line 254) represent hyperplanes corresponding to labeled samples, while the dashed lines (e.g., dashed green lines 256 and 258) represent hyperplanes corresponding to unlabeled samples. Similar to FIG. 2A, the red-colored lines correspond to labeled samples of "Class +1" and the blue-colored lines correspond to labeled samples of "Class −1." Furthermore, in diagram 250, three classifiers (previously indicated in diagram 200 as lines which intersect the input space) are indicated as points within version space $V$ 260: $w_1$, $w_2$, and $w_3$.

Moreover, it can be seen from diagram 250 that unlabeled samples with hyperplanes which intersect version space $V$ 260 are informative, as compared to unlabeled samples with hyperplanes which do not intersect version space $V$ 260 (i.e., that pass outside version space $V$ 260). For example, hyperplane 258 (indicated by a green dashed line) does not intersect version space $V$ 260, and therefore corresponds to an unlabeled sample which is non-informative. On the other hand, a hyperplane 256 (also indicated by a green dashed line) does intersect version space $V$ 260, and therefore corresponds to an unlabeled sample which is informative. Thus, the unlabeled sample whose hyperplanes intersect version space $V$ 260 may be considered informative and good candidates for querying, while the unlabeled samples whose hyperplanes do not intersect version space $V$ 260 may be considered non-informative and weak candidates for querying.

B. Active Learning in the Pool-Based Setting

For the non-private case, consider the popular Cohn Atlas Ladner (CAL) algorithm for active learning in the separable case. This approach may not necessarily be constructive, and is meant to develop a theoretical understanding. To construct an actual active learner, certain modifications are made, as described below in Section V. The task of the active learner is to query an oracle for labels of points in $\mathcal{M}$ and, using the received labels, keep updating both the version space and the classifier. Let t=1, 2, . . . T denote the step number at which the classifier and version space are updated. Let $\mathcal{L}_t$ be the set of samples that have been queried, labeled, and removed from the pool $\mathcal{M}$ after the end of the $t^{th}$ step. Define $\mathcal{L}_0 = \Phi$, the empty set. At the beginning of the $(t^{th})$ step, assume that c unlabeled samples are drawn from $\mathcal{M} \setminus \mathcal{L}_{t-1}$ are to be queried, where \ is the set difference operator. After training using the newly available labels, the classifier $w_t$ can be released.

C. Informative Samples Reduce the Version Space

The CAL method can be described as choosing the c samples per step. The version space can be denoted after the $t^{th}$ step by $V_t$. Recall that points in the current pool, $\mathcal{M} \setminus \mathcal{L}_t$, belong to the input space $\chi$, and are thus hyperplanes in the hypothesis space $\mathcal{W}$. By definition (and with reference to FIG. 2B), hyperplanes that do not intersect $V_t$ do not provide useful information in terms of improving the learner's predictive capability, and thus need not be queried. By contrast, a hyperplane corresponding to a sample that intersects $V_t$ indicates that some classifiers in $V_t$ must be removed because they would classify that sample incorrectly. Thus, the system queries labels of c of such informative pool samples and the system can obtain a new smaller version space $V_{t+1} \subset V_t$. With the new labels, the system can train a new classifier $w_{t+1}$, which by construction is consistent with all the correct predictions that $w_t$ can make. This process is repeated until the system obtains the version space $V_T$ and the classifier $w_T$.

D. Label Complexity

The label complexity of a classifier can be defined as the number of labels that must be obtained before the classifier can be trained to a desired accuracy. For traditional non-interactive supervised learning, the label complexity required to reach an error $\eta \in [0,1]$ with respect to the optimal classifier is given by $\Omega(d/\eta)$. Here, d is the Vapnik and Chervonenkis ("VC") dimension of the classifier. The VC dimension is the cardinality of the largest set of points that can be separated with zero error by the given classifier. In practice, the accuracy can be computed over a labeled dataset—termed the "holdout" dataset—that is representative of the underlying data distribution but is not used in training.

Because invoking the oracle is costly, the label complexity must be controlled. It is well known that applying active learning heuristics to choose only informative samples to be queried can incur significantly lower label complexity than non-interactive supervised learning which trains on all samples.

Lemma 1: The active learning workflow described in Section III-C can output a hypothesis with an error less than $\eta$ with high probability, after $O(\log(1/\eta))$ rounds.

The proof requires that a large enough number of informative samples (denoted by $\gamma \leq c$) be labeled prior to learning $w_t$, for every t. $\gamma$ depends on the Vapnik and Chervonenkis ("VC") dimension of the classifier and the "disagreement coefficient." It is sufficient to note that choosing $\gamma$ samples ensures that the version space $V_t$ shrinks fast enough with increasing t, resulting in more and more accurate classifiers. The label complexity of active learning is thus given by $O(\gamma \log(1/\eta))$. In other words, the label complexity is proportional to $\log(1/\eta)$ compared to $1/\eta$ for non-interactive supervised learning.

IV. Active Learning Setting with Differential Privacy

In the embodiments described herein, the system facilitates differentially private pool-based active learning. An analysis of pool-based active learning under the differential privacy paradigm is described herein. The adversarial model is described, and then the privacy aware active learning workflow is given. The workflow can satisfy the differential privacy guarantees. Then, the system can quantify the price paid for privacy in the form of increased label complexity. The effects of differentially private mechanisms in the version space are examined. Careful consideration of the privacy/performance tradeoff is necessary while updating the active learner in the differentially private setting.

A. Adversarial Model Under Differential Privacy

The adversarial model is slightly different from the one usually encountered for the standard supervised learning scenario. Because the learner typically starts with a small training set (i.e., n is small), it is not a goal to protect the privacy of the training set. Instead, the system aims to protect the privacy of the pooled samples whose labels are queried and used to update the classifier. Hence, the assumption is made that the adversary knows the training set of n samples. Furthermore, the assumption is made that the adversary possesses an adjacent pool of m samples denoted by $\mathcal{M}' = \{z'_j, j=1, 2, \ldots, m\}$, where there is a particular $i \leq m$ such that $z'_i \neq z_i$ while for all valid $j \neq i$ it holds that $z'_j = z_j$. Crucially, the adversary does not know the index i of the sample that differs.

Moreover, the adversary should not be able to identify $z_i$ by observing any model update $w_t$. Furthermore, the adversary should not be able to discover whether $z_i$ was used to train $w_t$. Let the vector of classifiers be $W_T=(w_1, w_2, \ldots, w_T)$. Let c unlabeled samples be drawn from the pool and examined at each step, as in the non-private case. Let $Q_T=(S_1, S_2, \ldots, S_T)$ with $S_k=(s_{(k-1)c+1}, \ldots s_{kc})$. Here, $S_k$, $k \in \{1, \ldots, T\}$ is a binary vector of length c, containing selection results, in which $s_{(k-1)c+j}=1$ if the $j^{th}$ sample from $S_k$ was chosen for labeling by the oracle, and $s_{(k-1)c+j}=1$ if it was not chosen for labeling by the oracle.

It is required that the probability of deriving a certain classifier will change by at most a small multiplicative factor, even if the differing sample was used for training the learner or not. Concretely, using the definition of $\epsilon$-differential privacy:

$$P(W_T, Q_T | \mathcal{M}) \le \exp(\epsilon) P(W_T, Q_T | \mathcal{M}')$$

Note that the adversary's view can include only the adjacent pool $\mathcal{M}'$, and the outputs of the adversary are the vector classifiers $W_T$ and the binary vector $Q_T$ that indicates which samples are chosen for labeling.

B. Differentially Private Active Learning Workflow

As before, an initial classifier $w_O$ is trained on n training samples. Based on the assumptions, $w_O$ is available to the adversary. One goal is to improve the accuracy of the classifier with the help of the pool $\mathcal{M}$, without revealing to the adversary which samples in $\mathcal{M}$ caused the model updates. The same publishing schedule can be retained, i.e., c samples are queried at each step, and the classifier models $w_1, w_2, \ldots, w_T$, are published and available to the adversary. To achieve privacy, the following privacy-aware version of the workflow in Section III is described below.

Assume that the system is at the beginning of the $t^{th}$ step of the model update process, the version space is $V_{t-1}$, and the corresponding model maintained by the learner is $w_{t-1}$. The learner has access to the pool $\mathcal{U}_{t-1} = \mathcal{M} \setminus \mathcal{L}_{t-1}$. Now, consider the hyperplanes in the hypothesis space $\mathcal{W}$ corresponding to the unlabeled samples in $\mathcal{U}_{t-1}$. Some of these hyperplanes intersect $V_{t-1}$, while others pass outside it.

In the non-private case, a hyperplane that intersects $V_{t-1}$ represents an informative sample whose label should be queried. However, in the differentially private version, a different approach must be adopted in order to choose samples for querying. Concretely, for each $i=1, 2, \ldots |\mathcal{U}_{t-1}|$, if the hyperplane corresponding to $z_i \in \mathcal{U}_{t-1}$ passes through $V_{t-1}$, query $z_i$ with probability $p > \frac{1}{2}$ (e.g., a "first random probability distribution"). Otherwise, if the hyperplane corresponding to $z_i$ passes outside $V_{t-1}$, query $z_i$ with probability $1-p$ (e.g., a "second random probability distribution"). If $z_i$ was informative but not chosen for querying, it is returned to the pool for possible querying later. If $z_i$ was non-informative and not chosen for querying, it is discarded or removed from the pool. The procedure is repeated for $z_{i+1}$ until c samples from $\mathcal{U}_{t-1}$ have been examined. Note that this is inefficient compared to the non-private version because, in order to achieve privacy, not all informative samples (i.e., those whose hyperplanes intersect $V_{t-1}$) are chosen, and some non-informative samples (i.e., those whose hyperplanes do not intersect $V_{t-1}$) are chosen. The inefficiency depends on p.

Let us denote the non-private classifier trained using the newly labeled points by $w_t^i$. From this classifier, the system can device and release a $\epsilon_m$-differentially private classifier $w_t$. At each update step, the adversary's view can include the previously released (differentially private) classifier $w_{t-1}$, an adjacent pool $\mathcal{M}'$, and the binary vector $S_t$, indicating which samples have been chosen for labeling just before updating the classifier (as defined in Section IV-A). Thus, by applying the definition of differential privacy, the system can obtain, for each $t < T$:

$$P(w_t | w_{t-1}, S_t, \mathcal{M}) \le \exp(\epsilon) P(w_t | w_{t-1}, S_t, \mathcal{M}') \quad \text{Equation (1)}$$

The approach of the embodiments described herein is agnostic to the particular mechanism used to achieve $\epsilon_m$-differential privacy in $w_t$. Thus, the system can use output perturbation, objective perturbation, or the exponential mechanism. To reiterate: (a) the model updates (or classifier models) $w_1, w_2, \ldots, w_T$ are derived using a differentially private mechanism; and (b) $w_t$ has the desired accuracy $\eta$. As a result, a few privacy claims may be stated.

Proposition 1: As described above, at each step t, let Bernoulli(p) sampling be used to query samples whose hyperplanes intersect $V_{t-1}$, and Bernoulli(1-p) sampling is used to query samples whose hyperplanes do not intersect $V_{t-1}$. For $p \ge \frac{1}{2}$, this selection procedure is $\epsilon_p$-differentially private with $$\epsilon_p = \log \frac{p}{1-p}.$$

Proof: Assume that the samples in $\mathcal{M}$ and $\mathcal{M}'$ are ordered consistently (e.g., in exactly the same sequence). While this may be a conservative assumption, the situation can occur, for example, if the learner and the adversary use a known algorithm to rank unlabeled samples based on their informativeness. Assume that the adversary has observed $w_t$ and knows its version space $V'_t$. Since $\mathcal{M}$ and $\mathcal{M}'$ differ in one element, $V'_t$ may or may not be the same as $V_t$.

Let $s_i$ denote the selection variable for a pool sample $z_i \in \mathcal{M}$ or $z'_i \in \mathcal{M}'$. Notes that $s_i=1$ indicates that $z_i$ (or equivalently $z'_i$) is selected for querying, while $s_i=0$ indicates otherwise. Then, to construct the bound for $s_i=1$, we use the worst case situation in which the hyperplane corresponding to $z_i$ intersects $V_t$ but the hyperplane corresponding to $z'_i$ does not intersect $V_t$. Thus, $$\left| \log \frac{P(s_i = 1 | \mathcal{M}, w_t)}{P(s_i = 1 | \mathcal{M}', w_t)} \right| < \left| \log \frac{P(s_i = 1 | z_i \text{ intersects } \mathcal{V}_t)}{P(s_i = 1 | z'_i \text{ does not intersect } \mathcal{V}'_t)} \right| = \left| \log \frac{p}{1-p} \right|$$

The situation $s_i=0$ is argued similarly, for the worst case where the hyperplane corresponding to $z_i$ does not intersect $V_t$ but the hyperplane corresponding to $z'_i$ does intersect $V'_t$. As $p > \frac{1}{2}$, we drop the absolute value notation and the result follows.

Theorem 1: Suppose the differentially private learner is trained over T steps with c samples labeled per step. Let $|\mathcal{M}| = |\mathcal{M}'| > Tc$. The released classifiers are $\epsilon$-differentially private, where $\epsilon = \epsilon_m + \epsilon_p$.

Proof: Again assume that, at every step t, the adjacent pools $\mathcal{U}_t$ and $\mathcal{U}'_t$ are indexed consistently (that is, ordered in exactly the same sequence). The classifier is updated at each step using a $\epsilon_m$-differentially private mechanism. This results in:

$$\frac{P(W_T, Q_T | \mathcal{M})}{P(W_T, Q_T | \mathcal{M}')} = \prod_{t=1}^{T} \frac{P(w_t, S_t | \mathcal{M}, W_{t-1})}{P(w_t, S_t | \mathcal{M}', W_{t-1})}$$

-continued $$= \prod_{t=1}^{T} \frac{P(w_t \mid w_{t-1}, \mathcal{M}, S_i)P(S_i \mid w_{t-1}, \mathcal{M})}{P(w_t \mid w_{t-1}, \mathcal{M}', S_i)P(S_i \mid w_{t-1}, \mathcal{M}')} \quad \text{Equation (2)}$$

$$= \frac{P(w_i \mid w_{i-1}, \mathcal{M}, S_i)}{P(w_i \mid w_{i-1}, \mathcal{M}', S_i)} \prod_{k \in \tau} \frac{P(S_k \mid w_{k-1}, \mathcal{M})}{P(S_k \mid w_{k-1}, \mathcal{M}')} \quad \text{Equation (3)}$$

$$= \frac{P(w_i \mid w_{i-1}, \mathcal{M}, S_i)}{P(w_i \mid w_{i-1}, \mathcal{M}', S_i)} \prod_{k \in \tau} \prod_{1 \le j \le c} \frac{P(s_{(k-1)j+c} \mid w_{k-1}, \mathcal{M})}{P(s_{(k-1)j+c} \mid w_{k-1}, \mathcal{M}')} \quad \text{Equation (4)}$$

The assumption is that the sample that differs between $\mathcal{M}$ and $\mathcal{M}'$ was chosen for querying at step i≤T. To obtain Equation (2), observe that $w_t$ depends only on samples from $\mathcal{M}$ and on the immediately previous classifier $w_{t-1}$. Note that step 1 is not necessarily the first time the differing sample was encountered. For instance, the sample may have been informative at step t<i (i.e., as intersecting the version space $V_{t-1}$) but not selected for querying in the Bernoulli sampling process, and thus returned to the pool $\mathcal{U}_t$. This creates the possibility of the differing sample being chosen at a later step. The set $\tau \subseteq \{1, 2, \ldots, T\}$ in the second term of Equation (3) is the set of all steps (or time instances) at which the differing sample could be encountered in the pool-based active learning scenario. Note that this is significantly different from a stream-based (online) setting in which the differing sample is seen only once, whether it is chosen for querying or not. To obtain Equation (4), the system can use the definition of in $S_k$ Section IV-A.

For p≥½, the double product term in Equation (4) is maximized in two cases. Either of the following two situations may occur: (a) the differing sample, which belongs to $\mathcal{M}$, intersects $V_{i-1}$, and is queried by the learner, whereas its counterpart in $\mathcal{M}'$ does not intersect $V'_{i-1}$, but is queried by the adversary; or (b) at any step t≤T, the differing sample does not intersect $V_{t-1}$, and is not queried by the learner, whereas its counterpart in $\mathcal{M}'$ intersects $V'_{t-1}$, but is not queried by the adversary. In either situation (a) or (b), the probability ratio is p/(1−p). Because it is assumed and stipulated (as above) that a non-informative sample—one whose hyperplane does not intersect $V_{t-1}$—that is not chosen for querying is removed from the pool, the situation (b) occurs at most once in T steps. Subsequently, we can bound the ratio in Equation (1) using Proposition 1 as:

$$\left| \log \frac{P(W_T, Q_T \mid \mathcal{M})}{P(W_T, Q_T \mid \mathcal{M}')} \right| \le \left| \log \frac{P(w_i \mid w_{i-1}, \mathcal{M}, S_i)}{P(w_i \mid w_{i-1}, \mathcal{M}', S_i)} \right| + \left| \log \frac{p}{1-p} \right| \le \epsilon_m + \epsilon_p.$$

where the last inequality follows from Proposition 1 and the definition of $\epsilon_m$ in Equation (1).

C. Effect of Privacy on Label Complexity

Proposition 2: For ½≤p<1 and classification probability η, consider the privacy-aware active learning workflow as described in Section IV.B. The label complexity of this approach is $O((1/p) \log(1/\eta))$.

Proof: As noted earlier in the Lemma 1, the active learning algorithm without privacy outputs a hypothesis with error probability less than η in $O(\log(1/\eta))$ rounds, provided at least γ informative samples are labeled at the tth step. In contrast, for the differentially private case, samples whose hyperplanes intersect $V_t$ are queried only with probability p. Other non-informative samples are queried with probability 1−p to create uncertainty about which samples from the pool are labeled. The non-informative samples do not contribute to the shrinkage of $V_t$. Thus, to ensure that at least γ informative samples are labeled per privacy-preserving selection step, it is necessary to query $O(\gamma/p)$ samples per step. With this larger number of per-step queries, the conditions of Lemma 1 are again met, and the system can obtain a hypothesis with error less than η with high probability, after $O(\log(1/\eta))$ rounds. The effective label complexity is thus $O((\gamma/p)\log(1/\eta))$, and the result follows. As p≥1\2, this is only a moderate increase in label complexity.

D. Version Space of Utility of DP Mechanisms

The differentially private classifier $w_t$ is, at best, a noisy approximation of the optimal classifier $w_t^*$ corresponding to the version space $V_t$. For the linearly separable case, if the noise is small enough to keep $w_t$ inside $V_t$, its consistency with respect to $V_t$ is preserved. However, if too much noise is added, then $w_t$ moves out of $V_t$, which means that it will classify some of the labeled samples incorrectly.

This has important implications for how we evolve the classifier $w_t$. One way is to update the previous noisy classifier $w_{t-1}$ using the new labels obtained in the $t^{th}$ step. The preceding argument, however, suggests that this might compromise the classifier's consistency with respect to the version space.

A better approach is to first preserve all the samples labeled by the oracle until step t (i.e., "all currently labeled samples to date"), and then train a differentially private $w_t$ from those samples, without using $w_{t-1}$. In some embodiments, the system can train a differentially private $w_t$ based on a subset of all the currently labeled sample to date, without using $w_{t-1}$.

V. An SVM-Based Active Learner

Consider an experimental learner designed to evaluate SVM-based active learning with and without privacy. For simplicity, only one sample is queried at each step t, and its label is added to the set of already known labels. Using the available labels, a new non-private classifier $w_t^{SVM}$ is trained using a dual SVM solver. To choose the most informative sample in the non-private, the following heuristic approach (sometimes referred to as "uncertainty sampling") may be used:

Choose the sample closest to the hyperplane representing the SVM classifier. This gives a concrete approach to training the active learner without having to explicitly maintain the version space. To see why this is reasonable, recall that the optimal classifier $w_t^*$ is the center of mass of the version space $V_t$. Choosing the pool sample z whose hyperplane halves $V_t$ reduces the error of $w_t^*$ exponentially with the number of queried samples. Then, if $V_t$ has a regular shape, the hyperplane corresponding to z would pass very close to $w_t^*$. Moreover, it turns out that the non-private SVM classifier (denoted by $w_t^{SVM}$) is an approximation to $w_t^*$. Hence, the system can choose to query the sample z whose hyperplane is closest to $w_t^{SVM}$. This heuristic approach leverages the version space-based development from the previous section, without requiring us to explicitly keep track of $V_t$. Concretely, this way of choosing a sample z to be queried ensures that $V_t$ keeps shrinking reasonably fast with increasing t. As a consequence, a sequence of increasingly accurate classifiers, $w_t^{SVM}$ are learned. In the non-private case, each released classifier is given by $w_t = w_t^{SVM}$.

To perform differentially-private sample selection for querying (again without having to explicitly maintain the version space), the system can maintain a ranked list of pool points, based on their distance to $w_t^{SVM}$. Then, the system can implement a Bernoulli-p trial, i.e., toss a coin with bias p and if the coin lands heads, query the top-ranked pool point (i.e., the closest pool point). If the coin lands tails, repeat the Bernoulli-p trial with the second closest pool point, and so on, until a sample is queried. All samples not chosen for querying can be returned to the pool for ranking and possible re-use in subsequent learning steps. The system can then retrieve the label of the single queried sample, add it to the set of already known labels, and use the dial SVM solver to derive a new clean classifier $w_t^{SVM}$.

To guarantee differential privacy in the update step, the sensitivity-based output perturbation approach may be used, where scalar zero-mean Laplace-distributed noise is added to each component of $w_t^{SVM}$. Thus, in the differentially private case, each released classifier is given by $w_t = w_t^{SVM} + v_t$. To obtain $v_t$, a conventional approach for non-interactive supervised SVM learning may be used. Specifically, the scale parameter $\lambda_t$ of the Laplacian noise components $v_t^i$, i=1, . . . , d is given by:

$$\lambda_t \geq \frac{4LC\kappa\sqrt{d}}{\epsilon_m n_t} \quad \text{Equation (5)}$$

where L is the Lipschitz constant, C is a cost parameter in the SVM dual optimization problem, κ is the kernel upper bound, d is the feature dimension and $n_t$ is the number of labeled samples in $\mathcal{L}_t \cup \mathcal{T}$ used to train the active learner at step t. In this situation with the default $\ell_2$-norm kernel, L=1, κ=1 and C is input to the dual optimization problem. It is also possible to have derived $w_t^{SVM}$ and $v_t$ by solving the primal problem, but it has been experimentally discovered that the primal solution is more sensitive to noise. A detailed comparison of primal and dual solvers for SVMs in the privacy-aware active learning context is not included herein. The distribution of noise added to each component of $w_t^{SVM}$ is then given by the following relation for i=1, . . . , d:

$$f(v_t^i) = \frac{1}{2\lambda_t}\exp\left(-\frac{|v_t^i|}{\lambda_t}\right) = Laplace(0, \lambda_t)$$

The inverse dependence of $\lambda_t$ on $n_t$ indicates a second privacy-utility tradeoff in addition to the increase in label complexity: Although active learning guarantees that $n_t \ll |\mathcal{M}|$, the inverse dependence unfortunately means that a classifier trained on $n_t$ samples should be released with more noise than one trained on all $|\mathcal{M}|$ samples. The extra noise may shift $w_t$ out of $V_t$, the version space of the corresponding noiseless classifier, thereby reducing its accuracy.

VI. Experimental Evaluation

Figure 3:
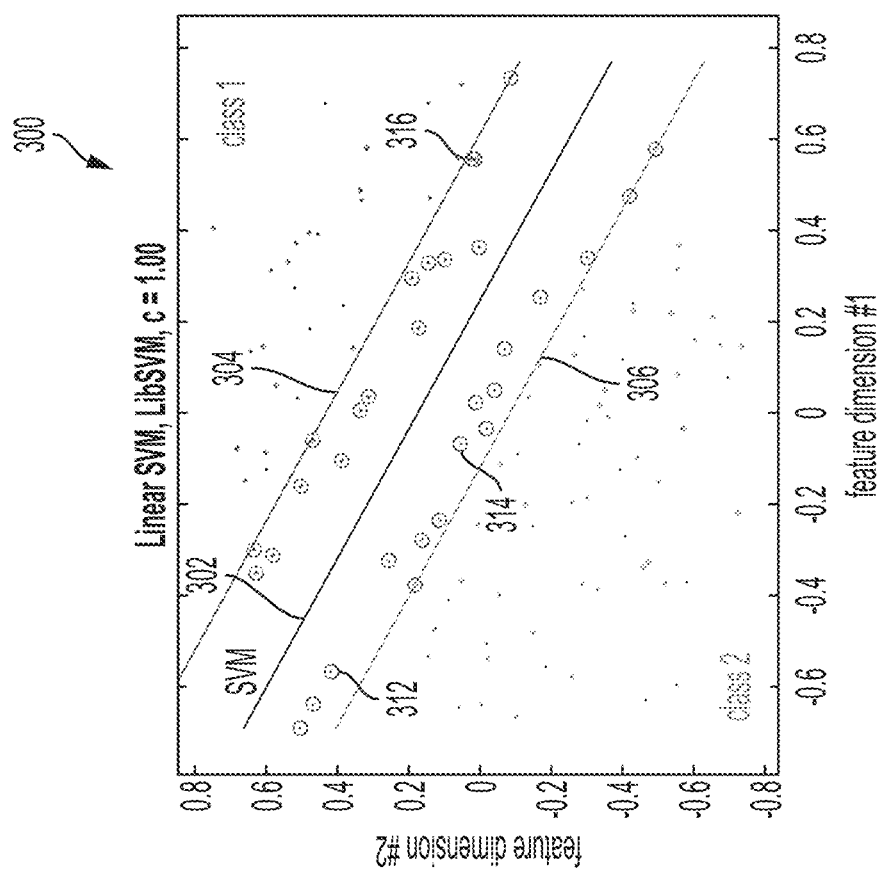
FIG. 3 depicts a graph illustrating one feature dimension across a second feature dimension, using a linear SVM, in accordance with an embodiment of the present application.

A synthetic dataset of 120 2-dimensional points is generated in two linearly separable classes. FIG. 3 depicts a graph 300 illustrating one feature dimension across a second feature dimension, using a linear SVM, in accordance with an embodiment of the present application. In graph 300, a middle black diagonal solid line 302 indicates the decision boundary, an upper blue diagonal solid line 304, and a lower green diagonal solid line 306 represent the margins ±1. That is, the blue dots above line 304 are classified under "class 1" while the green dots below line 306 are classified under "class 2." The circled points (e.g., 312, 314, and 316) represent the support vectors. Graph 300 depicts the constellation of points and the SVM decision boundary in the non-private case, in accordance with an embodiment of the present application. In each experimental run, the SVM-based active learner is seeded with two randomly selected training samples, one from each class. The remaining points are assigned to the pool M.

Figure 4B:
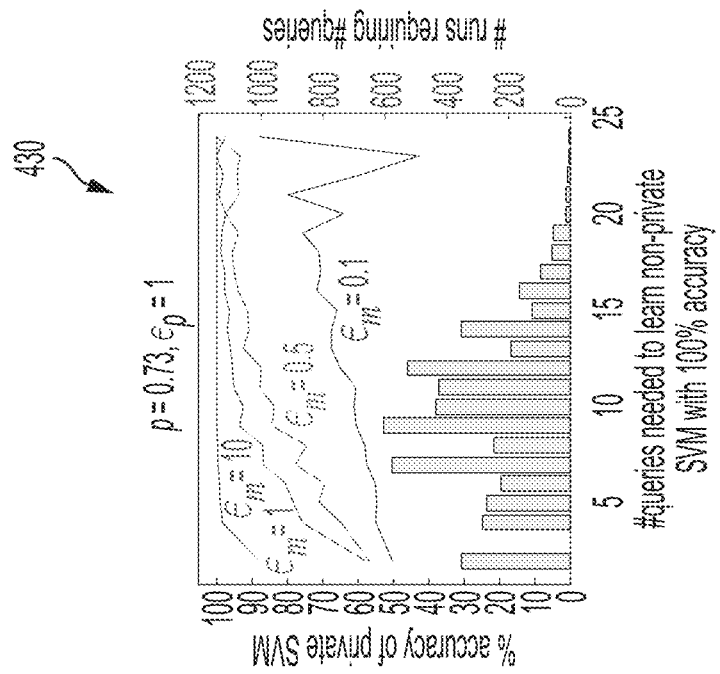
FIG. 4B depicts a graph illustrating runs with labels across the number of labels needed with non-private classifier updates, in accordance with an embodiment of the present application.
Figure 4A:
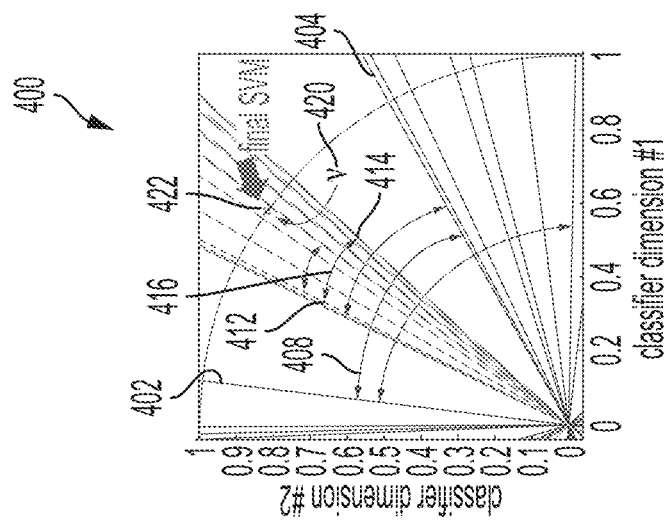
FIG. 4A depicts a diagram illustrating the version space and the final, learned non-private classifier in one experimental run, in accordance with an embodiment of the present application.

FIG. 4A depicts a diagram 400 illustrating the version space and the final, learned non-private classifier in one experimental run, in accordance with an embodiment of the present application. In diagram 400, blue lines (e.g., 402 and 404) represent the Class 1 samples and green lines (e.g., 412 and 414) represent the Class 2 samples. The red cross 422 represents the final, trained, non-private SVM. The arcs (e.g., 408 and 416) show how the version space progressively shrinks as more and more informative points are labeled, until version space 420 is a tiny arc of the red unit circle (422). The version space plot uses the fact that each point $x_i$, label $y_i$, and consistent classifier w satisfy $y_i(w^T x_i) > 0$. Substituting the values of $x_i$, $y_i$ in the inequality, the system can obtain intervals for consistent classifiers on the unit circle.

An objective is to examine, first, the effect of differential privacy in the selection step ($\epsilon_r$) on the label complexity, and second, the effect of differential privacy in the update step ($\epsilon_m$) on the accuracy of the final released classifier $w_T$. For each privacy setting, i.e., ($\epsilon_r$, $\epsilon_m$), the system can run the differentially private active learning experiment 5000 times.

Figure 4C:
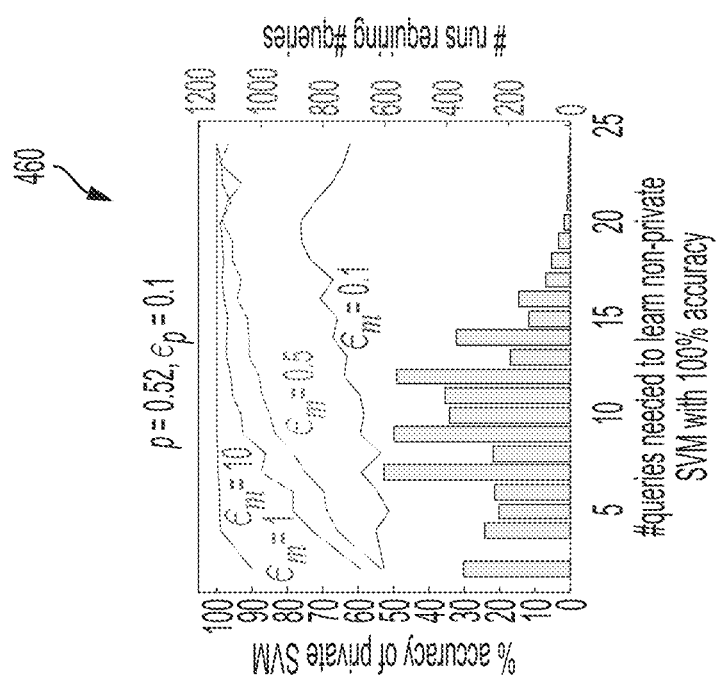
FIG. 4C depicts a graph illustrating runs with labels across the number of labels needed with non-private classifier updates, in accordance with an embodiment of the present application.

FIG. 4B depicts a graph 430 illustrating runs with labels across the number of labels needed with non-private classifier updates, in accordance with an embodiment of the present application. Graph 430 illustrates that the number of labels needed for the SVM learner with $\epsilon_m = \infty$ (i.e., a non-private classifier update) to completely separate the two classes is a multimodal distribution (indicated by distributions 332 and 334). FIG. 4C depicts a graph 460 illustrating runs with labels across the number of labels needed with non-private classifier updates, in accordance with an embodiment of the present application. Graph 460 illustrates that with privacy-aware sample selection, the learner may take longer to query key data points, which can result in an increase of the label complexity.

The label complexity depicted in the histograms of FIGS. 4B and 4C are obtained for $\epsilon_p$ values of 0.1, and 1 corresponding to p=0.52 and 0.73 respectively. Since label complexity is measured with respect to the sequence of clean (un-released) non-private classifiers, it is impacted only by $\epsilon_p$ and not by $\epsilon_m$. The empirical label complexity is reported as the number of queries needed until the non-private SVM achieves 100% accurate separation of the data into classes 1 and 2. The privacy mechanism of randomizing the selection of the samples to be labeled does not adversely affect label complexity. Rather, the rate at which the randomized selection shrinks the version space is faster than choosing the closest sample to $w_t^{SVM}$ in some experimental runs, and slower in other runs. Thus, the label complexity is sometimes slightly lower, and sometimes slightly higher than that observed for the non-private case. That is, the label complexity is not significantly affected by a change in $\epsilon_p$. The accuracy of the final released differential private classifier $w_t$ is adversely affected if the classifier update is made more private (i.e., by lowering $\epsilon_m$), or if the active learner had used very few labels.

The accuracy plots in FIGS. 4B and 4C are obtained for $\epsilon_m \in \{0.1, 1, 0.5, 10\}$. Suppose that an empirical label complexity of $\ell$ is observed in N($\ell$) experimental runs. The system can compute the accuracy of the private SVM averaged over N($\ell$) runs, for each $\ell$, and report those values in the plots of FIGS. 3B and 3C. With more noise in the classifier update, i.e., with smaller $\epsilon_m$, the accuracy falls below 100%. Additionally, FIGS. 4B and 4C reveal a kind of "no free lunch" tradeoff: Learners that use more labeled samples are more accurate. This is because they need less noise for the same amount of privacy. Conversely, learners that use fewer labeled samples result in more error-prone privacy-aware classifiers because they need more noise for the same amount of privacy.

VI. Summary

Thus, in the embodiments described herein, the system analyzes differentially private active learning from the perspective of its steadily shrinking version space in a pool-based setting. The privacy guarantees are described, and the analysis also reveals tradeoffs that must be considered in the design of differentially private active learning schemes. First, privacy-aware sample selection causes only a moderate increase in the label complexity. Second, privacy-aware learner updates require adding noise to the classifier, which may reduce its accuracy. Notably, the amount of noise added can be significantly more than that observed in non-interactive supervised learning because fewer samples are used for training. Care should be taken to ensure that noise added in successive update steps does not have a cumulative detrimental effect on the accuracy of the classifier.

In summary, it is preferable to train the active learner anew at each querying step, using all available labeled samples, rather than updating an existing noisy learner.

Figure 5:
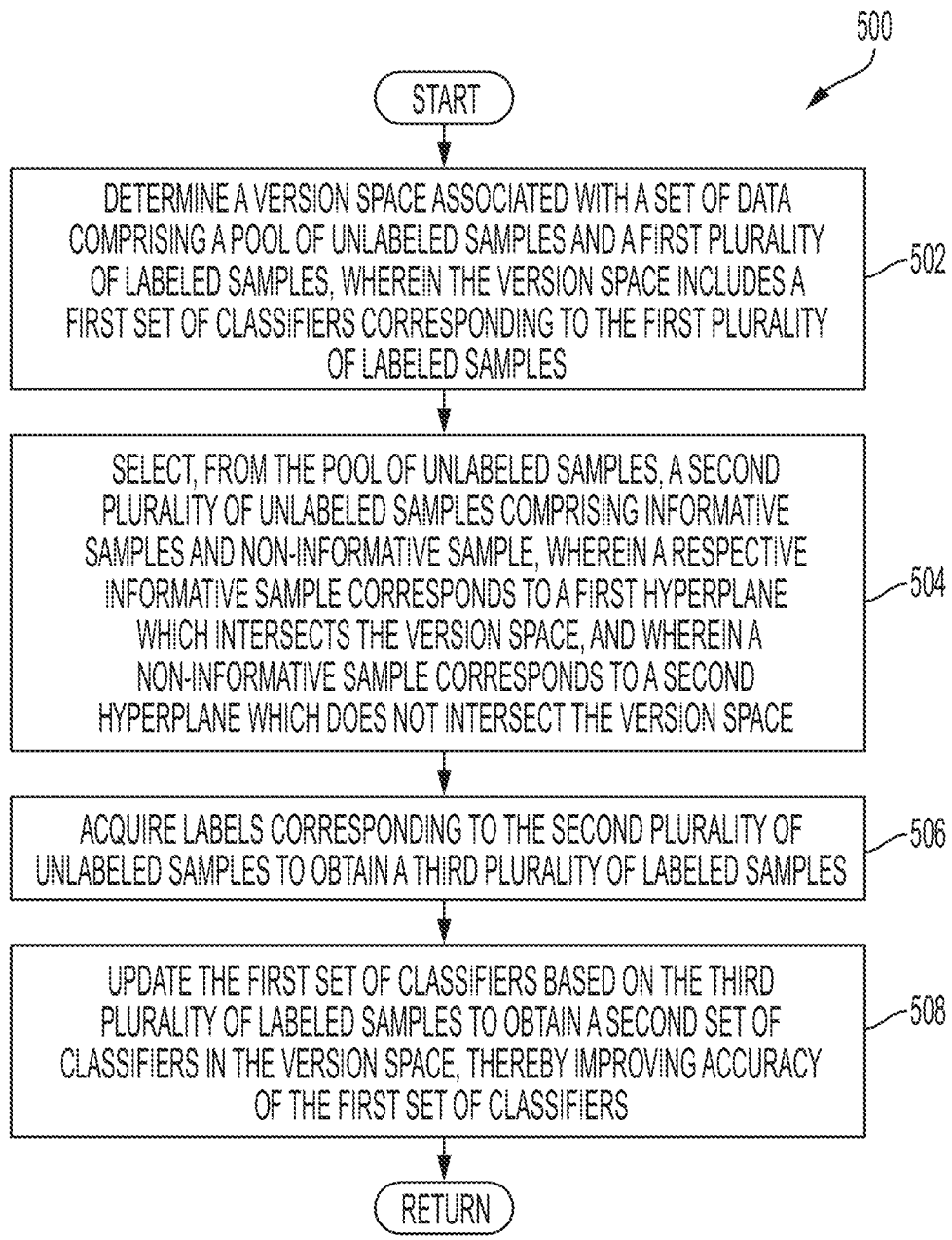
FIG. 5 presents a flowchart illustrating a method for facilitating data classification, in accordance with an embodiment of the present application.

VII. Exemplary Methods for Facilitating Data Classification and Achieving Differential Privacy in a Pool-Based Setting for Active Learning FIG. 5 presents a flowchart 500 illustrating a method for facilitating data classification, in accordance with an embodiment of the present application. During operation, the system determines a version space associated with a set of data comprising a pool of unlabeled samples and a first plurality of labeled samples, wherein the version space includes a first set of classifiers corresponding to the first plurality of labeled samples (operation 502). The first set of classifiers can be consistent with the first plurality of labeled samples, as described above in relation to FIG. 2B. The system selects, from the pool of unlabeled samples, a second plurality of unlabeled samples comprising informative samples and non-informative samples, wherein a respective informative sample corresponds to a first hyperplane which intersects the version space, and wherein a respective non-informative sample corresponds to a second hyperplane which does not intersect the version space (operation 504). Selecting the second plurality of unlabeled samples can be based on a random probability distribution, such as the Bernoulli distribution, as described above in Section IV.B. Specifically, the system can select the informative and non-informative samples of the second plurality of unlabeled samples as described below in relation to FIG. 6.

The system acquires labels corresponding to the second plurality of unlabeled samples to obtain a third plurality of labeled samples (operation 506). The system updates the first set of classifiers based on the third plurality of labeled samples to obtain a second set of classifiers in the version space, thereby improving accuracy of the first set of classifiers. In some embodiments, the system trains a classifier for the set of training data based on all the current labeled samples, which can include the first plurality of labeled samples and the third plurality of labeled images (e.g., the most recently determined labels), as described above in Section IV.D. In other embodiments, the system trains a classifier for the set of training data based on a subset of the currently labeled samples, wherein the subset contains a plurality of recently labeled samples and excludes a plurality of older labeled samples. The system can determine "recently" labeled and "older" labeled samples based on a predetermined threshold or time period, which can be automatically configured by the system or set by a user or administrator of the system.

Figure 6:
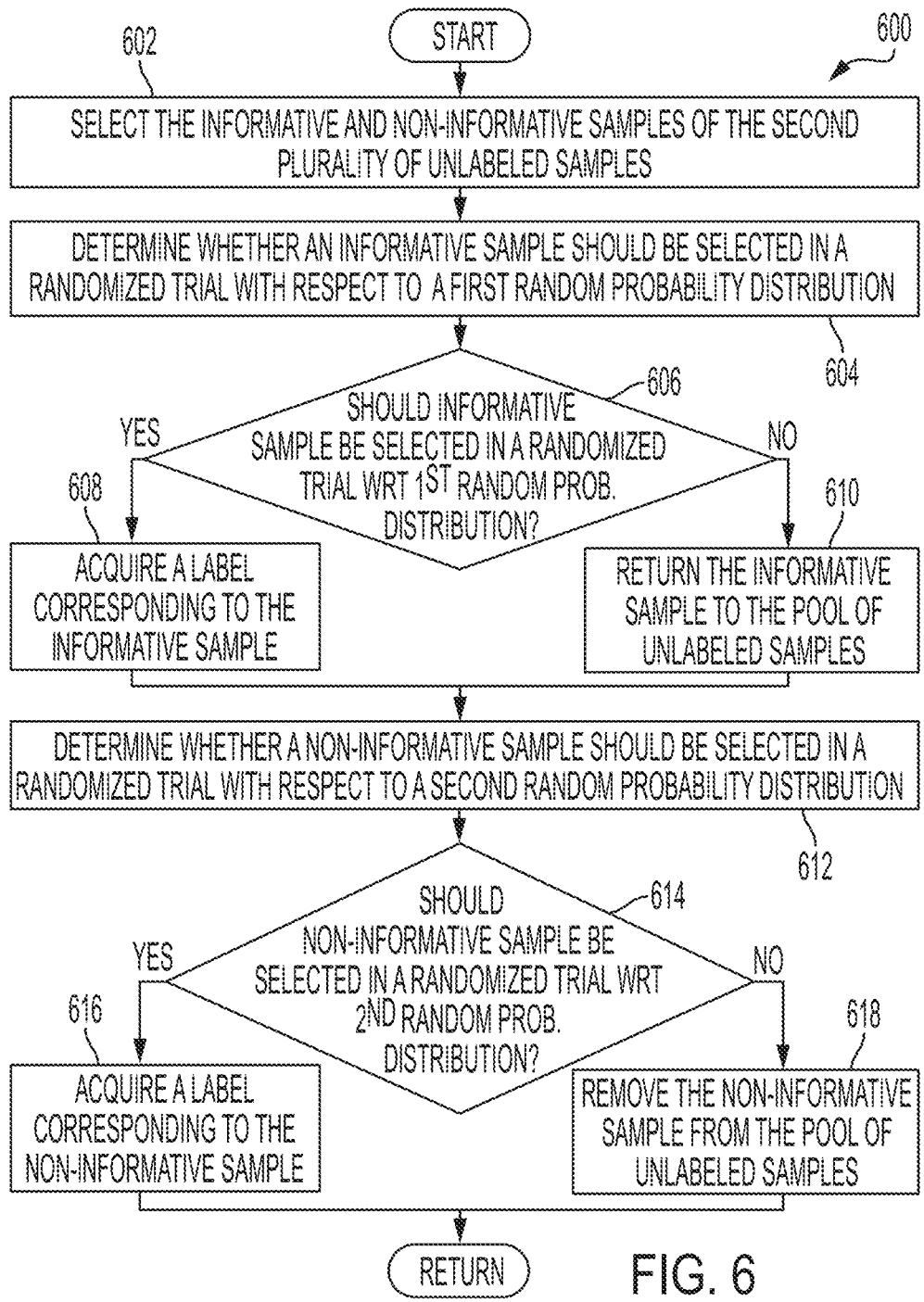
FIG. 6 presents a flowchart illustrating a method for selecting unlabeled samples, in accordance with an embodiment of the present application.

FIG. 6 presents a flowchart 600 illustrating a method for selecting unlabeled samples, in accordance with an embodiment of the present application. During operation, the system selects the informative and the non-informative samples of the second plurality of unlabeled samples (operation 602). In some embodiments, this selection can be based on a Bernoulli selection, a version space, a ranked and ordered list, and an informative band around an optimal classifier. The system determines whether an informative sample should be selected in a randomized trial with respect to a first random probability distribution (operation 604). If the informative sample should be selected in a randomized trial with respect to the first random probability distribution (decision 606), the system acquires a label corresponding to the informative sample (operation 608). If the informative sample should not be selected in a randomized trial with respect to the first random probability distribution (decision 606), the system returns the informative sample to the pool of unlabeled samples (operation 610). The first or second random probability distribution can be based on a Bernoulli distribution. The first random probability distribution can be based on, e.g., $p > \frac{1}{2}$, and the second random probability distribution can be based on, e.g., $1-p$, as described above in Section IV.B.

The system determines whether a non-informative sample should be selected in a randomized trial with respect to a second random probability distribution (operation 612). If the non-informative sample should be selected in a randomized trial with respect to the second random probability distribution (decision 614), the system acquires a label corresponding to the non-informative sample (operation 616). If the non-informative sample should not be selected in a randomized trial with respect to the second random probability distribution, the system removes the non-informative sample from the pool of unlabeled samples (operation 618).

Figure 7:
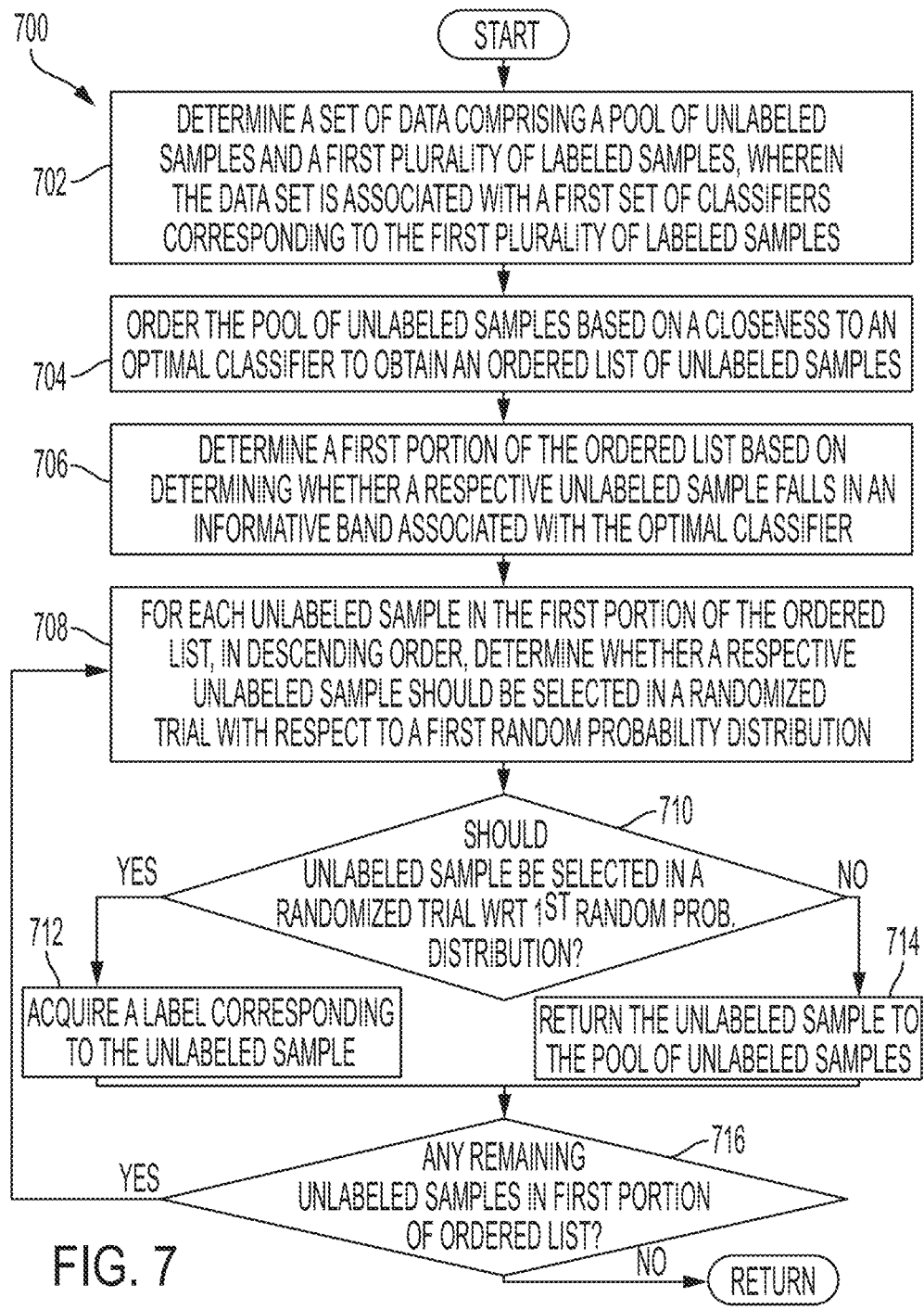
FIG. 7 presents a flowchart illustrating a method for facilitating data classification, using an SVM classifier, in accordance with an embodiment of the present application.

FIG. 7 presents a flowchart 700 illustrating a method for facilitating data classification, using an SVM classifier, in accordance with an embodiment of the present application. During operation, the system determines a set of data comprising a pool of unlabeled samples and a first plurality of labeled samples, wherein the data set is associated with a first set of classifiers corresponding to the first plurality of labeled samples (operation 702). The system orders the pool of unlabeled samples based on a closeness to an optimal classifier for the labeled samples to obtain an ordered list of unlabeled samples (operation 704). The system determines a first portion of the ordered list based on determining whether a respective unlabeled sample falls in an informative band associated with the optimal classifier (operation 706). For each unlabeled sample in the first portion of the ordered list, in descending order, the system determines whether a respective unlabeled sample should be selected in a randomized trial with respect to a first random probability distribution (operation 708). If the respective unlabeled sample should be selected in a randomized trial with respect to the first random probability distribution (decision 710), the system acquires a label corresponding to the respective unlabeled sample (operation 712). If the respective unlabeled sample should not be selected in a randomized trial with respect to the first random probability distribution (decision 710), the system returns the respective unlabeled sample to the pool of unlabeled samples (operation 714).

Exemplary Computer and Communication System

Figure 8:
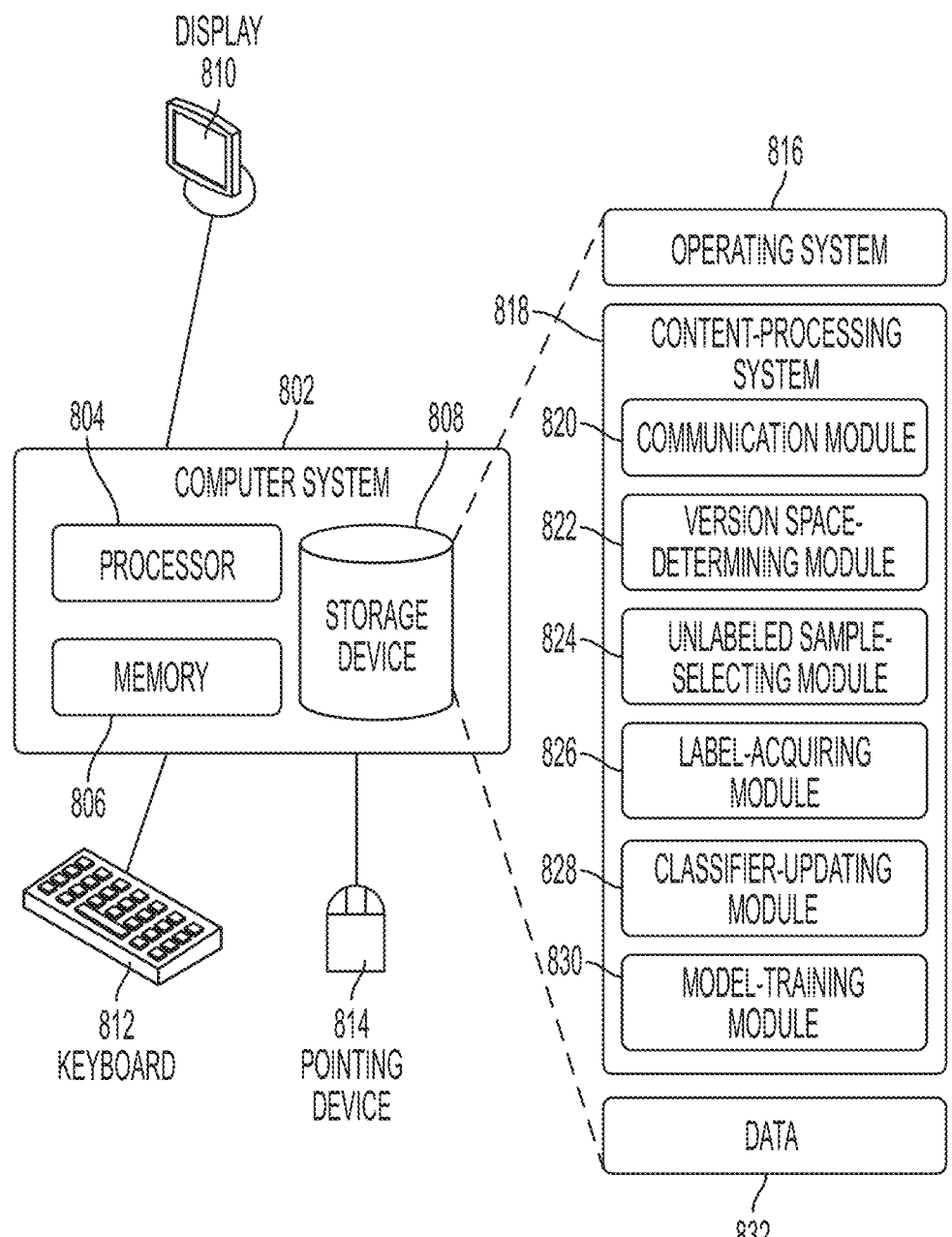
FIG. 8 presents an exemplary computer and communication system which facilitates data classification, in accordance with an embodiment of the present application.

FIG. 8 presents an exemplary computer and communication system 802 which facilitates data classification, in accordance with an embodiment of the present application. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store an operating system 816, a content-processing system 818, and data 832.

Content-processing system 818 can include instructions, which when executed by computer system 802, can cause computer system 802 to perform methods and/or processes described in this disclosure. Specifically, content-processing system 818 may include instructions for sending and/or receiving data packets to/from other network nodes across a computer network (communication module 820). A data packet can include data, a request, labels, a model, a classifier, training data, labeled samples, and unlabeled samples.

Content-processing system 818 can further include instructions for determining a version space associated with a set of data comprising a pool of unlabeled samples and a first plurality of labeled samples, wherein the version space includes a first set of classifiers corresponding to the first plurality of labeled samples (version space-determining module 822). Content-processing system 818 can include instructions for selecting, from the pool of unlabeled samples, a second plurality of unlabeled samples comprising informative samples and non-informative samples, wherein a respective informative sample corresponds to a first hyperplane which intersects the version space, and wherein a respective non-informative sample corresponds to a second hyperplane which does not intersect the version space (unlabeled sample-selecting module 824). Content-processing system 818 can include instructions for acquiring labels corresponding to the second plurality of unlabeled samples to obtain a third plurality of labeled samples (label-acquiring module 826). Content-processing system 818 can include instructions for updating the first set of classifiers based on the third plurality of labeled samples to obtain a second set of classifiers in the version space, thereby improving accuracy of the first set of classifiers (classifier-updating module 828 and model-training module 830).

Data 832 can include any data that is required as input or that is generated as output by the methods and/or processes described in this disclosure. Specifically, data 832 can store at least: data; a set of data; an input space; a classifier; a set of classifiers; a version space; an unlabeled sample; a labeled sample; a pool of unlabeled samples; a plurality of labeled samples; a label; a hyperplane; an informative sample; a non-informative sample; an indicator of whether a sample is informative or non-informative; a random probability distribution; a Bernoulli distribution; an indicator of whether a sample should be selected in a randomized trial with respect to a random probability distribution; an indicator of whether a sample meets a random probability distribution; an indicator of whether to acquire a label for a sample, return the sample to a pool of unlabeled samples, or to discard or remove the sample from the pool of unlabeled samples; an updated or trained classifier; recently labeled samples; older labeled samples; a predetermined threshold or time period; an output perturbation; an objective perturbation; an exponential mechanism; an optimal classifier; a support vector; an SVM classifier; margins; a list; an ordered list; a portion of an ordered list; an informative band; and an informative band associated with an optimal classifier.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method for facilitating data classification, the method comprising:
   determining a version space associated with a set of data comprising a pool of unlabeled samples and a first plurality of labeled samples,
      wherein the version space includes a first set of classifiers corresponding to the first plurality of labeled samples;
   selecting, from the pool of unlabeled samples, a second plurality of unlabeled samples comprising informative samples and non-informative samples,
      wherein a respective informative sample corresponds to a first hyperplane which intersects the version space, and wherein a respective non-informative sample corresponds to a second hyperplane which does not intersect the version space;
   acquiring labels corresponding to the second plurality of unlabeled samples to obtain a third plurality of labeled samples; and
   updating the first set of classifiers based on the third plurality of labeled samples to obtain a second set of classifiers in the version space, thereby improving accuracy of the first set of classifiers.

2. The method of claim 1, wherein selecting the second plurality of unlabeled samples is determined using randomized trials with respect to a Bernoulli distribution.

3. The method of claim 1, wherein selecting the second plurality of unlabeled samples comprises:
selecting the informative samples of the second plurality of unlabeled samples by:
in response to determining that a first informative sample should be selected in a randomized trial with respect to a first random probability distribution, acquiring a label corresponding to the first informative sample; and
in response to determining that a second informative sample should not be selected in a randomized trial with respect to the first random probability distribution, returning the second informative sample to the pool of unlabeled samples.

4. The method of claim 1, wherein selecting the second plurality of unlabeled samples comprises:
selecting the non-informative samples of the second plurality of unlabeled samples by:
in response to determining that a first non-informative sample should be selected in a randomized trial with respect to a second random probability distribution, acquiring a label corresponding to the first non-informative sample; and
in response to determining that a second non-informative sample should not be selected in a randomized trial with respect to the second random probability distribution, removing the second non-informative sample from the pool of unlabeled samples.

5. The method of claim 1, wherein the version space represents a volume comprising:
the first set of classifiers indicated as points in an input space associated with the set of data;
the pool of unlabeled samples indicated as a first set of hyperplanes in the input space; and
labeled samples, including one or more of the first and the third plurality of labeled samples, indicated as a second set of hyperplanes in the input space.

6. The method of claim 1, further comprising:
updating the first set of classifiers based on the third plurality of labeled samples and further based on the first plurality of labeled samples.

7. The method of claim 1, wherein the first plurality of labeled samples and the third plurality of labeled samples comprise currently labeled samples, and wherein the method further comprises:
training a classifier for the set of training data based on all the currently labeled samples.

8. The method of claim 1, wherein the first plurality of labeled samples and the third plurality of labeled samples comprise currently labeled samples, and wherein the method further comprises:
training a classifier for the set of training data based on a subset of the currently labeled samples,
wherein the subset contains a plurality of recently labeled samples and excludes a plurality of older labeled samples.

9. The method of claim 1, wherein updating the first set of classifiers is based on one or more of:
an output perturbation;
an objective perturbation; and
an exponential mechanism.

10. The method of claim 1, wherein a respective classifier is a Support Vector Machine (SVM) classifier, and wherein the method further comprises:
ordering the unlabeled samples based on a closeness to an optimal classifier for the labeled samples to obtain an ordered list of unlabeled samples; and
for each unlabeled sample in a first portion of the ordered list, in descending order:
in response to determining that a first unlabeled sample should be selected in a randomized trial with respect to a first random probability distribution, acquiring a label corresponding to the first unlabeled sample; and
in response to determining that a second unlabeled sample should not be selected in a randomized trial with respect to the first random probability distribution, returning the second unlabeled sample to the pool of unlabeled samples.

11. The method of claim 10,
wherein determining the first portion of the ordered list is based on determining whether a respective sample falls in an informative band associated with the optimal classifier.

12. A computer system for facilitating data classification, the computer system comprising:
a processor; and
a storage device storing instructions that when executed by the processor cause the processor to perform a method, the method comprising
determining a version space associated with a set of data comprising a pool of unlabeled samples and a first plurality of labeled samples,
wherein the version space includes a first set of classifiers corresponding to the first plurality of labeled samples;
selecting, from the pool of unlabeled samples, a second plurality of unlabeled samples comprising informative samples and non-informative samples,
wherein a respective informative sample corresponds to a first hyperplane which intersects the version space, and wherein a respective non-informative sample corresponds to a second hyperplane which does not intersect the version space;
acquiring labels corresponding to the second plurality of unlabeled samples to obtain a third plurality of labeled samples; and
updating the first set of classifiers based on the third plurality of labeled samples to obtain a second set of classifiers in the version space, thereby improving accuracy of the first set of classifiers.

13. The computer system of claim 12, wherein selecting the second plurality of unlabeled samples is based on a Bernoulli distribution.

14. The computer system of claim 12, wherein selecting the second plurality of unlabeled samples comprises:
selecting the informative samples of the second plurality of unlabeled samples by:
in response to determining that a first informative sample should be selected in a randomized trial with respect to a first random probability distribution, acquiring a label corresponding to the first informative sample; and
in response to determining that a second informative sample should not be selected in a randomized trial with respect to the first random probability distribution, returning the second informative sample to the pool of unlabeled samples.

15. The computer system of claim 12, wherein selecting the second plurality of unlabeled samples comprises:

selecting the non-informative samples of the second plurality of unlabeled samples by:

in response to determining that a first non-informative sample should be selected in a randomized trial with respect to a second random probability distribution, acquiring a label corresponding to the first non-informative sample; and in response to determining that a second non-informative sample should not be selected in a randomized trial with respect to the second random probability distribution, removing the second non-informative sample from the pool of unlabeled samples.

16. The computer system of claim 12, wherein the version space represents a volume comprising:

the first set of classifiers indicated as points in an input space associated with the set of data;

the pool of unlabeled samples indicated as a first set of hyperplanes in the input space; and labeled samples, including one or more of the first and the third plurality of labeled samples, indicated as a second set of hyperplanes in the input space.

17. The computer system of claim 12, wherein the first plurality of labeled samples and the third plurality of labeled samples comprise currently labeled samples, and wherein the method further comprises:

training a classifier for the set of training data based on all the currently labeled samples.

18. The computer system of claim 12, wherein the first plurality of labeled samples and the third plurality of labeled samples comprise currently labeled samples, and wherein the method further comprises:

training a classifier for the set of training data based on a subset of the currently labeled samples, wherein the subset contains a plurality of recently labeled samples and excludes a plurality of older labeled samples.

19. The computer system of claim 12, wherein updating the first set of classifiers is based on one or more of:

an output perturbation;

an objective perturbation; and an exponential mechanism.

20. The computer system of claim 12, wherein a respective classifier is a Support Vector Machine (SVM) classifier, and wherein the method further comprises:

ordering the unlabeled samples based on a closeness to an optimal classifier for the labeled samples to obtain an ordered list of unlabeled samples; and for each unlabeled sample in a first portion of the ordered list, in descending order:

in response to determining that a first unlabeled sample should be selected in a randomized trial with respect to a first random probability distribution, acquiring a label corresponding to the first unlabeled sample; and in response to determining that a second unlabeled sample should not be selected in a randomized trial with respect to the first random probability distribution, returning the second unlabeled sample to the pool of unlabeled samples, wherein determining the first portion of the ordered list is based on determining whether a respective sample falls in an informative band associated with the optimal classifier.

\* \* \* \* \*